(12) United States Patent
Pujar et al.

(10) Patent No.: US 10,024,188 B2
(45) Date of Patent: Jul. 17, 2018

(54) HIGH TEMPERATURE COMPOSITE INNER FIXED STRUCTURE

(71) Applicant: ROHR, Inc., Chula Vista, CA (US)

(72) Inventors: Vijay V. Pujar, San Diego, CA (US); Teresa Kruckenberg, La Mesa, CA (US)

(73) Assignee: ROHR, INC., Chula Vista, CA (US)

( * ) Notice: Subject to any disclaimer, the term of this patent is extended or adjusted under 35 U.S.C. 154(b) by 516 days.

(21) Appl. No.: 14/635,768

(22) Filed: Mar. 2, 2015

(65) Prior Publication Data

US 2016/0265383 A1     Sep. 15, 2016

(51) Int. Cl.
| | |
|---|---|
| *F01D 1/00* | (2006.01) |
| *F01D 25/00* | (2006.01) |
| *F01D 25/14* | (2006.01) |
| *F02K 1/78* | (2006.01) |
| *B82Y 30/00* | (2011.01) |

(52) U.S. Cl.
CPC ......... *F01D 25/005* (2013.01); *F01D 25/145* (2013.01); *F02K 1/78* (2013.01); *B82Y 30/00* (2013.01); *F05D 2240/14* (2013.01); *F05D 2260/96* (2013.01); *F05D 2300/434* (2013.01); *F05D 2300/603* (2013.01); *Y02T 50/672* (2013.01); *Y02T 50/675* (2013.01)

(58) Field of Classification Search
CPC . F01D 25/24; F01D 25/26; F02K 1/82; F02K 1/827; F02K 1/78; F02K 1/54
See application file for complete search history.

(56) References Cited

U.S. PATENT DOCUMENTS

| | | | | |
|---|---|---|---|---|
| 5,527,584 | A * | 6/1996 | Darfler | B29C 70/083 428/116 |
| 6,051,302 | A * | 4/2000 | Moore | B29C 70/08 239/265.19 |
| 2008/0166563 | A1* | 7/2008 | Brittingham | C08J 3/18 428/411.1 |
| 2008/0286564 | A1* | 11/2008 | Tsotsis | B29C 70/025 428/332 |
| 2009/0148614 | A1* | 6/2009 | Buczek | C23C 4/12 427/475 |
| 2009/0176112 | A1* | 7/2009 | Kruckenberg | B82Y 30/00 428/457 |
| 2011/0049292 | A1* | 3/2011 | Kruckenberg | B64D 45/02 244/1 A |
| 2014/0011414 | A1* | 1/2014 | Kruckenberg | B32B 5/16 442/181 |

OTHER PUBLICATIONS

Navarro de Miranda et al, Evaluation of Carbon Fiber Composites Modified by in Situ Incorporation of Carbon Nanofibers, 2011, Materials Research.*

(Continued)

*Primary Examiner* — Pascal M Bui Pho
*Assistant Examiner* — Edwin Kang
(74) *Attorney, Agent, or Firm* — Snell & Wilmer, L.L.P.

(57) ABSTRACT

An inner fixed structure for an aircraft nacelle may comprise a nanoreinforced polyimide composite skin. The nanomaterials may increase thermal conductivity and decrease microcracking in the inner fixed structure. The inner fixed structure may comprise an inner polyimide composite skin, an acoustic core, and an outer polyimide composite skin. The inner fixed structure may be blanketless.

13 Claims, 3 Drawing Sheets

(56) References Cited

OTHER PUBLICATIONS

FAA, Aviation Maintenance Technician Handbook-Airframe, Chapter 7 Advanced Composite Materials, 2012, FAA, vol. 2, pp. 7-7, 8, 11,12.*
FAA, Aviation Maintenance Technician Handbook-Airframe, Chapter 7 Advanced Composite Materials, 2012, FAA, vol. 2, pp. 7-1 to 7-12.*

* cited by examiner

HIGH TEMPERATURE COMPOSITE INNER FIXED STRUCTURE

FIELD

The present disclosure relates to composite materials, and more particularly, to high temperature composite materials in aircraft nacelles.

BACKGROUND

Composite materials have various advantageous properties over conventional metal materials. In particular, composite materials may be lighter than metals such as aluminum. However, some composite matrix materials do not perform well at high sustained temperatures. For example, toughened epoxy based composites typically are limited to sustained temperatures of approximately 250° F. (120° C.). Polyimide based composites can be used at sustained temperatures of up to about ~500° F. (260° C.). However, polyimide composites are susceptible to microcracking after prolonged exposure to such high temperatures.

Inner fixed structures of the thrust reverser in aircraft nacelles may be subject to high temperatures from a gas turbine engine contained within the nacelle during flight. For inner fixed structures that may be comprised of epoxy based composites, a thermal blanket may be attached to the IFS to protect the IFS from heat from the engine. However, the thermal blanket and the hardware used for attaching the blanket to the composite may increase the size and weight of the IFS. The thermal blanket also makes it difficult to directly access the composite IFS for routine inspection. It may be desirable to build a lightweight composite IFS without a thermal blanket. However, conventional epoxy based composite materials used in an IFS may not perform well at the operating temperatures reached without a thermal blanket.

SUMMARY

An inner fixed structure for an aircraft nacelle may comprise a core, such as a honeycomb core, a first polyimide composite skin coupled to a first side of the core, and a second polyimide composite skin coupled to a second side of the core. The first polyimide composite skin may comprise nanomaterials. The second polyimide composite skin may comprise nanomaterials.

In various embodiments, the inner fixed structure may be installed without a thermal blanket, i.e., the inner fixed structure may be a blanketless inner fixed structure. The nanomaterials may comprise at least one of carbon nanotubes, carbon nanofibers, or graphene nanoplatelets. At least one of the first polyimide composite skin or the second polyimide composite skin may be coupled to the core with an adhesive film. The adhesive film may comprise nanomaterials. The nanomaterials may increase a thermal conductivity of the first polyimide composite skin. The nanomaterials may be grown on carbon fibers or distributed in the polyimide resin or both in at least one of the first polyimide composite skin or the second polyimide composite skin. At least one of the first polyimide composite skin or the second polyimide composite skin may comprise a nanoreinforced polyimide surface film. The nanomaterials may be distributed in a polyimide resin matrix in at least one of the first polyimide composite skin or the second polyimide composite skin. The first polyimide skin my comprise perforations for acoustic performance. The inner fixed structure may comprise a thermal barrier layer coupled to the second polyimide composite skin.

A nacelle may comprise a thrust reverser with a composite inner fixed structure. The composite inner fixed structure may comprise an acoustic core, a first polyimide composite skin, and a second polyimide composite skin. The first polyimide composite skin may comprise nanomaterials. The nanomaterials may be configured to increase a thermal conductivity of the first polyimide composite skin and to increase resistance to microcracking of the first polyimide composite skin. The second polyimide composite skin may comprise nanomaterials. The nanomaterials may be configured to increase a thermal conductivity of the second polyimide composite skin and to increase resistance to microcracking of the second polyimide composite skin.

In various embodiments, the inner fixed structure may comprise a thermal barrier layer coupled to the second polyimide composite skin to form a blanketless inner fixed structure. The nanomaterials may be grown on carbon fibers in at least one of the first polyimide composite skin or the second polyimide composite skin. The nanomaterials may be dispersed in a polyimide resin matrix in at least one of the first polyimide composite skin or the second polyimide composite skin. The acoustic core may comprise at least one of titanium, aluminum, nickel or stainless steel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
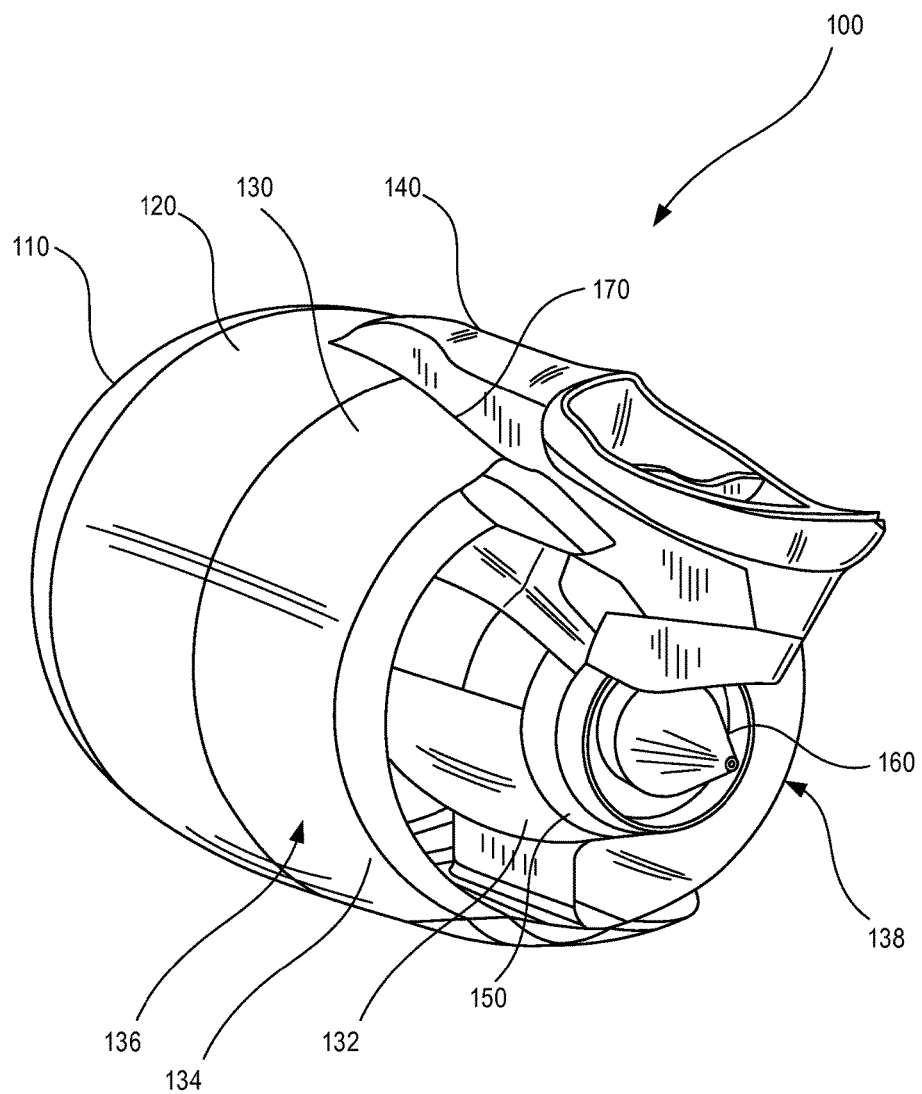
FIG. 1 illustrates a perspective view of a nacelle for an aircraft in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

An inner fixed structure ("IFS") for a nacelle may comprise a nanoreinforced polyimide composite skin. Polyimide is generally capable of withstanding higher temperatures than other composite matrix materials, such as epoxy. However, the difference in the coefficient of thermal expansion ("CTE") between polyimide and carbon fibers, combined with changes in the polyimide resin due to prolonged exposure to high temperatures in the operating environment, may result in microcracking of the polyimide resin matrix.

Nanomaterials may be grown on carbon fibers or distributed in a polyimide resin. The nanomaterials may reinforce the polyimide resin and reduce susceptibility to micrcracking during thermal cycling. The nanomaterials may have a CTE between the CTE of the polyimide resin and the CTE of carbon fibers. Thus, the nanomaterials may decrease the average CTE of the polyimide resin matrix and decrease the mismatch between the polyimide resin and the carbon fibers. The nanomaterials may also protect the polyimide from degradation at high temperatures in the operating environment. Both may prevent or significantly curtail microcracking of the polyimide resin. Additionally, the nanomaterials may increase the thermal conductivity of the polyimide composite skin, which may allow for more rapid heat dissipation by bypass air flowing over the IFS through the bypass air duct. The increased thermal conductivity may also decrease the prevalence of localized hot spots in the IFS which may cause damage to the composite material.

The increased thermal capabilities of the IFS may allow the IFS to be used without thermal blanket protection. This may lead to a reduction in weight from the elimination of the thermal blanket and any associated attachment hardware used to attach the thermal blanket. Additionally, the size of the IFS may be reduced, because the area previously reserved for the thermal blanket may be available for an IFS with a smaller radius. The decrease in size of the IFS may allow for improved aerodynamic efficiency of the IFS, as well as weight reduction due to the smaller size of the IFS.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and an outer fixed structure ("OFS") 134. Bypass air from an engine fan may flow in a generally annular bypass air duct defined between the IFS 132 and the OFS 134. The IFS 132 may be formed together with or be coupled to at its aft end a core cowl 150, which in turn is adjacent to an exhaust nozzle 160 for core engine exhaust air. The thrust reverser 130 may further be split into a left half 136 and a right half 138, such that there is, for example, a left half and a right half of IFS 132. The left half 136 and the right half 138 may be hinged to the pylon 140 at hinges 170. The left half 136 and the right half 138 may hinge open at hinges 170 in order to provide access to the engine for inspection or servicing. The left and right halves of the IFS 132 may together help form a core compartment around the engine when the left and right halves 136, 138 of the thrust reverser are closed. The engine located within the core compartment may heat the core compartment to 450° F. (230° C.) or higher.

The IFS 132 may comprise an acoustic core sandwiched by nanoreinforced polyimide composite skin. The composite skin on the inner surface may include a thermal barrier coating. The IFS 132 may be capable of withstanding sustained temperatures up to 450° F. (230° C.) or higher without cracking. The IFS 132 may be a blanketless IFS, in which a thermal blanket is not coupled to the IFS 132.

Figure 2:
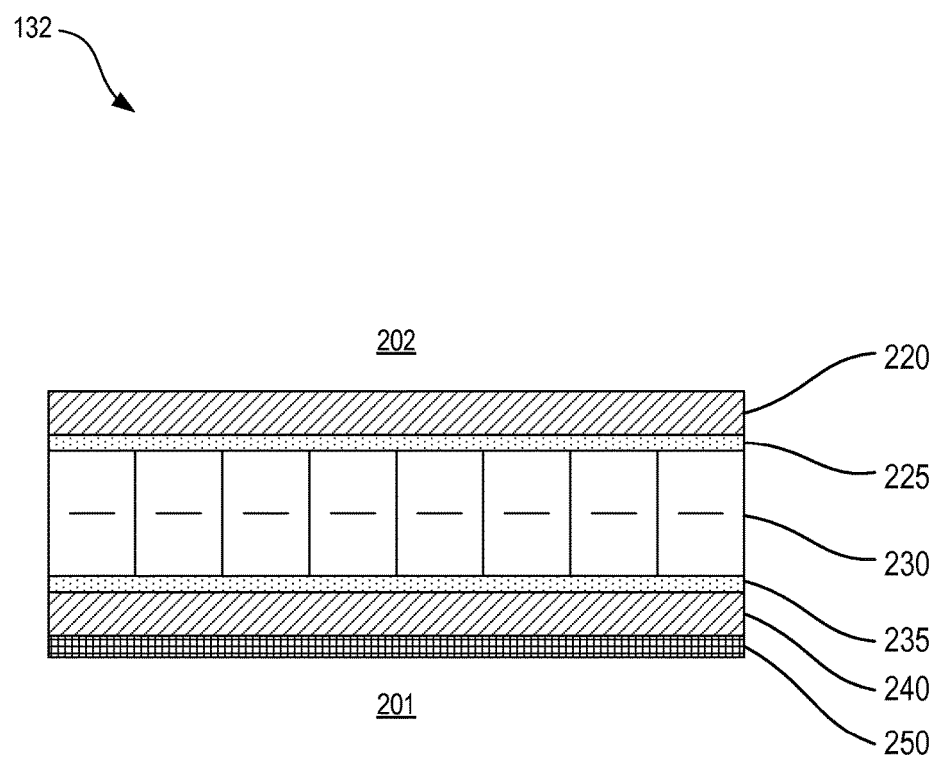
FIG. 2 illustrates a cross-section view of an IFS in accordance with various embodiments.

Referring to FIG. 2, a cross-section of the IFS 132 is illustrated according to various embodiments. The IFS 132 may be formed by assembling and bonding together an outer composite skin 220, an outer adhesive film 225, an acoustic core 230, an inner adhesive film 235, an inner composite skin 240, and a thermal barrier layer 250. The thermal barrier layer 250 may be adjacent to the core compartment 201, and the outer composite skin 220 may be adjacent to the bypass air duct 202.

The outer composite skin 220 and the inner composite skin 240 may comprise a polyimide composite skin. The polyimide composite skin may be a composite made up of a polyimide-based matrix with reinforcing fibers, such as carbon, glass, aramid, polyethylene, boron, and/or silicon carbide fibers. The polyimide-based matrix may be reinforced with nanomaterials. The outer composite skin 220 and the inner composite skin 240 may comprise a plurality of nanoreinforced polyimide composite plies. In various embodiments, the outer composite skin 220 may comprise a nanoreinforced surface film on the outer surface. In various embodiments, the outer composite skin 220 and the inner composite skin 240 may comprise between 4-20 composite plies. In various embodiments, the outer composite skin 220 may be perforated with a plurality of small holes. The acoustic core 230 may comprise a plurality of honeycomb cells. The honeycomb cells together with the perforations in the composite skin 220 may attenuate engine noise in a known manner. The outer composite skin 220 and the inner composite skin 240 may be bonded to the acoustic core 230 via the outer adhesive film 225 and the inner adhesive film 235, respectively. In various embodiments, at least one of the outer adhesive film 225 or the inner adhesive film 235 may comprise nanomaterials. The nanomaterials may increase the thermal conductivity of the outer adhesive film 225 and the inner adhesive film 235. The outer adhesive film 225 and the inner adhesive film 235 may be comprised of a polyimide resin or other high temperature resins capable of retaining adhesion strengths at the operating temperatures and loads.

The nanomaterials in the outer composite skin 220 and the inner composite skin 240 may increase the thermal conductivity of the outer composite skin 220 and the inner composite skin 240, and decrease cracking in the outer composite skin 220 and the inner composite skin 240. Thus, the IFS 132 may be capable of withstanding high temperatures in the core compartment 201 without a thermal blanket. By eliminating the thermal blanket, the radius of the IFS 132 may be decreased, which may result in a more aerodynamically efficient nacelle, a lower weight IFS, and allow a larger bypass air duct for nacelles of the same size.

The thermal barrier layer 250 may reflect heat from the core compartment 201 and/or insulate the composite skin 220 within the IFS 132 from high temperatures in the core compartment 201. Additionally, the thermal barrier layer 250 may distribute the heat from the core compartment 201 evenly across the inner composite skin 240, which may prevent localized hot spots in the inner composite skin 240 which could damage the inner composite skin 240. In various embodiments, the thermal barrier layer 250 may comprise a polyceramic prepreg reinforced with glass fabric, such as RM-6001 FireWalker polyceramic prepreg supplied by Renegade Materials Corporation. In various embodiments, the thermal barrier layer 250 may be a sprayed-on glass coating. Heat absorbed by the thermal barrier layer 250 from the core compartment may be conducted through the inner composite skin 240, the inner adhesive film 235, the acoustic core 230, the outer adhesive film 225, and the outer composite skin 220 to the bypass air duct 220. Cool air flowing through the bypass air duct 202 may convect heat away from the IFS 132.

The composite skins 220, 240 and the acoustic core 230 may be cured together. Conventional IFSs typically use an aluminum acoustic core. However, the curing process for polyimides may reach temperatures of 600° F. (320° C.) or higher, as opposed to temperatures of 350° F. (180° C.) for epoxy composites. Conventional resin-bonded aluminum cores may not withstand these high temperatures. Thus, in various embodiments, the acoustic core 230 may comprise a core construction capable of withstanding temperatures above 600° F. (320° C.), such as aluminum alloys capable of withstanding the higher temperatures, or cores made with alternative metallic alloys such as stainless steel, nickel alloys, or titanium alloys. In various embodiments, the bond between the core cells also may use methods such as laser welding or spot welding designed to retain their weldment at the high cure and operating temperatures. Other techniques during the fabrication process that are well known to those skilled in the art to maintain core integrity and prevent core crushing may be employed. In various embodiments, the conductance of the core may be increased by coating or cladding with a more conductive material such as aluminum, copper, or nickel to increase the thermal conductivity.

Figure 3:
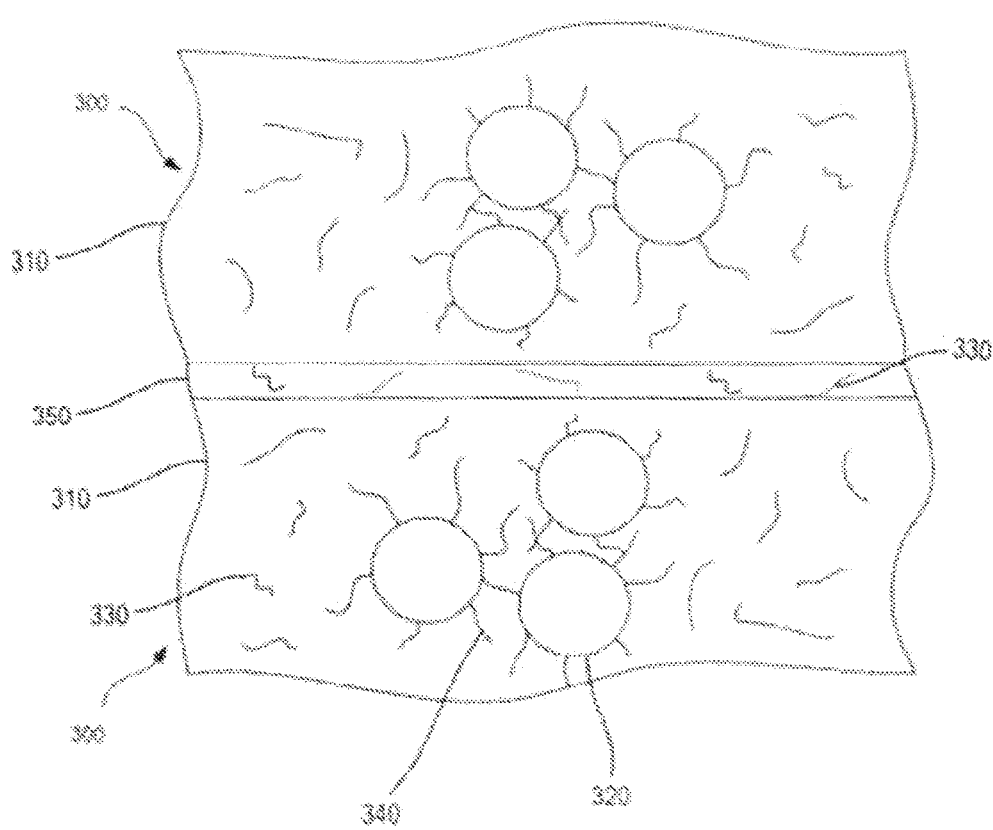
FIG. 3 illustrates an enlarged cross-section view of a composite ply in a composite IFS in accordance with various embodiments.

Referring to FIG. 3, an enlarged cross-section view of a composite ply 300 in a composite skin is illustrated according to various embodiments. The composite ply 300 may comprise a polyimide resin matrix 310 and a plurality of fibers 320. In various embodiments, the fibers 320 may comprise carbon fibers. However, in various embodiments, the fibers 320 may comprise glass, aramid, polyethylene, boron, and/or silicon carbide.

The composite ply 300 may comprise nanomaterials 330, 340. In various embodiments, the nanomaterials 330, 340 may comprise at least one of carbon nanotubes, carbon nanofibers, or graphene nanoplatelets. In various embodiments, the nanomaterials 340 may be grown on the fibers 320 in a known manner. The polyimide resin matrix 310 may be added to the fibers 320 after the nanomaterials 340 are grown on the fibers.

However, in various embodiments, the nanomaterials 330 may be dispersed throughout the polyimide resin matrix 310. The nanomaterials 330 may be added to the polyimide resin matrix 310 via a variety of methods. For example, the nanomaterials 330 may be added to a liquid polyimide resin and evenly dispersed therein, and then the polyimide resin may be extruded into a polyimide film comprising the nanomaterials 330. The polyimide film may be resin film infused with the fibers 320. In various embodiments, the nanomaterials 330 may be mixed in a solvent, such as alcohol or acetone. The solvent may be added to a polyimide resin, and the mixture may be preimpregnated into the carbon fabric and fill the spaces between individual fibers 320 within the fabric. In various embodiments, both the grown-on nanomaterials 340 and the distributed nanomaterials 330 may be present in the composite ply 300.

In various embodiments, a nanoreinforced polyimide film 350 comprising nanomaterials 330 may be cured to the composite ply 300 as a surface film or between adjacent composite plies 300. The nanoreinforced polyimide film 350 may act as a barrier layer which prevents degradation of the polyimide resin matrix 310.

The nanomaterials 330, 340 may have a CTE which is less than the CTE of the polyimide resin matrix 310 and closer to the CTE of the fibers 320. The nanomaterials 330, 340 may decrease the average CTE of the polyimide resin matrix 310, providing a closer match between the CTE of the polyimide resin matrix 310 and the CTE of the fibers 320. The difference in CTE between the fibers 320 and the polyimide resin matrix 310 may cause microcracking of the composite ply 300. The closer CTEs may prevent microcracking of the polyimide resin matrix 310, which may allow the composite ply 300 to retain its strength even after several thermal excursions to temperatures of 450° F. (230° C.) or higher. Additionally, the nanomaterials 330, 340 may increase the thermal conductivity of the composite ply 300. The increased thermal conductivity may allow the composite ply 300 to more rapidly dissipate heat built up in the composite ply 300, which may also help to prevent microcracking of the composite ply 300. The nanomaterials may also help stabilize the polyimide by protecting the polyimide from degradation at high temperatures in the operating environment. The increased resistance to microcracking and the increased thermal conductivity may allow for nanoreinforced polyimide composites to be utilized in an IFS without a thermal blanket. By removing the thermal blanket and the supporting hardware for attaching the blanket, the polyimide composite may decrease the weight of the IFS. The overall size of the IFS may also be decreased.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An inner fixed structure configured for use in a thrust reverser for an aircraft nacelle, the inner fixed structure comprising:
    a core;
    a first polyimide composite skin on an exterior side of the inner fixed structure, the first polyimide composite skin comprising a first set of 4 to 20 composite plies, each composite ply of the first set of 4 to 20 composite plies separated by a first nanoreinforced polyimide film, the first set of 4 to 20 composite plies coupled to a first side of the core, wherein the first set of 4 to 20 composite plies of the first polyimide composite skin comprises first nanomaterials and second nanomaterials, wherein the first nanomaterials comprise first carbon nanotubes grown on and coupled to carbon fibers, wherein the second nanomaterials are dispersed throughout a first polyimide resin matrix;
    a second polyimide composite skin on an interior side of the inner fixed structure, the second polyimide composite skin comprising a second set of 4 to 20 composite plies, each composite ply of the second set of 4 to 20 composite plies separated by a second nanoreinforced polyimide film, the second set of 4 to 20 composite plies coupled to a second side of the core, wherein the second set of 4 to 20 composite plies of the second polyimide composite skin comprises third nanomaterials; and
    a thermal barrier layer coupled to the second polyimide composite skin.

2. The inner fixed structure of claim 1, wherein the second nanomaterials comprise at least one of second carbon nanotubes, first carbon nanofibers, or first graphene nanoplatelets.

3. The inner fixed structure of claim 1, wherein at least one of the first polyimide composite skin or the second polyimide composite skin is coupled to the core with an adhesive film comprising fourth nanomaterials.

4. The inner fixed structure of claim 1, wherein the first nanomaterials and the second nanomaterials increase a thermal conductivity of the first polyimide composite skin.

5. The inner fixed structure of claim 1, wherein the third nanomaterials comprise second carbon nanotubes or first carbon nanofibers.

6. The inner fixed structure of claim 1, wherein the third nanomaterials are distributed in a second polyimide resin matrix in the second polyimide composite skin.

7. The inner fixed structure of claim 1, wherein the thermal barrier layer comprises a sprayed-on glass coating or a polyceramic prepreg reinforced with glass fabric.

8. A nacelle comprising a thrust reverser with a composite inner fixed structure, wherein the composite inner fixed structure comprises:
    an acoustic core;
    a first polyimide composite skin on an exterior side of the composite inner fixed structure, the first polyimide composite skin comprising a first set of 4 to 20 composite plies, each composite ply of the first set of 4 to 20 composite plies separated by a first nanoreinforced polyimide film, the first set of 4 to 20 composite plies of the first polyimide composite skin comprising first nanomaterials and second nanomaterials configured to increase a thermal conductivity of the first polyimide composite skin and increase a resistance to microcracking of the first polyimide composite skin, wherein the first nanomaterials comprise carbon nanotubes grown on and coupled to first carbon fibers, wherein the second nanomaterials are dispersed throughout a first polyimide resin matrix;
    a second polyimide composite skin on an interior side of the composite inner fixed structure, the second polyimide composite skin comprising a second set of 4 to 20 composite plies, each composite ply of the second set of 4 to 20 composite plies separated by a second nanoreinforced polyimide film, the second set of 4 to 20 composite plies of the second polyimide composite skin comprising third nanomaterials configured to increase a thermal conductivity of the second polyimide composite skin and increase a resistance to microcracking of the second polyimide composite skin; and
    a thermal barrier layer coupled to the second polyimide composite skin.

9. The nacelle of claim 8, wherein the thermal barrier layer comprises a sprayed-on glass coating or a polyceramic prepreg reinforced with glass fabric.

10. The nacelle of claim 8, wherein the third nanomaterials are grown on second carbon fibers in the second polyimide composite skin.

11. The nacelle of claim 8, wherein the third nanomaterials are dispersed in a second polyimide resin matrix in the second polyimide composite skin.

12. The nacelle of claim 8, wherein the acoustic core comprises at least one of aluminum, titanium, nickel, or stainless steel.

13. The nacelle of claim 8, wherein the first polyimide composite skin is coupled to the acoustic core to attenuate noise from an aircraft engine.

* * * * *